United States Patent
Young et al.

(10) Patent No.: US 7,310,380 B1
(45) Date of Patent: Dec. 18, 2007

(54) GENERIC TRANSMISSION PARAMETER CONFIGURATION

(75) Inventors: C. David Young, Plano, TX (US); Jeffrey A. Barton, Richardson, TX (US); Steven VanLaningham, Richardson, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 708 days.

(21) Appl. No.: 10/857,786

(22) Filed: May 28, 2004

(51) Int. Cl.
*H04L 27/00* (2006.01)

(52) U.S. Cl. .................................... 375/295

(58) Field of Classification Search ............... 375/216, 375/295; 455/73, 91
See application file for complete search history.

(56) References Cited

U.S. PATENT DOCUMENTS

| | | | |
|---|---|---|---|
| 4,504,946 A | 3/1985 | Raychaudhuri | 370/322 |
| 4,763,322 A | 8/1988 | Eizenhofer | 370/337 |
| 5,012,469 A | 4/1991 | Sardana | 370/322 |
| 5,067,171 A * | 11/1991 | Kawano | 455/436 |
| 5,113,187 A * | 5/1992 | Gorshe | 341/73 |
| 5,117,422 A | 5/1992 | Hauptschein et al. | 370/255 |
| 5,245,609 A | 9/1993 | Ofek et al. | 370/348 |
| 5,295,140 A | 3/1994 | Crisler et al. | 370/443 |
| 5,396,496 A | 3/1995 | Ito et al. | 370/314 |
| 5,420,858 A | 5/1995 | Marshall et al. | 370/352 |
| 5,448,698 A | 9/1995 | Wilkes | 395/200.01 |
| 5,450,394 A | 9/1995 | Gruber et al. | 370/17 |
| 5,457,681 A | 10/1995 | Gaddis et al. | 370/402 |
| 5,502,722 A | 3/1996 | Fulghum | 370/69 |
| 5,506,848 A | 4/1996 | Drakopoulos et al. | 370/336 |
| 5,568,477 A | 10/1996 | Galand et al. | 370/60 |
| 5,581,548 A | 12/1996 | Ugland et al. | 370/330 |
| 5,594,720 A | 1/1997 | Papadopoulos et al. | 370/330 |
| 5,598,417 A | 1/1997 | Crisler et al. | 370/348 |
| 5,613,198 A | 3/1997 | Ahmadi et al. | 370/337 |
| 5,625,629 A | 4/1997 | Wenk | 370/330 |
| 5,644,576 A | 7/1997 | Bauchot et al. | 370/437 |
| 5,652,751 A | 7/1997 | Sharony | 340/2.4 |
| 5,696,903 A | 12/1997 | Mahany | 709/228 |
| 5,719,868 A | 2/1998 | Young | 370/436 |

(Continued)

OTHER PUBLICATIONS

L. Pond and V. Li, "Bridging the Gap Interoperability, Survivability, Security," 1989 IEEE MILCOM, Conference Record, vol. 1 of 3.

(Continued)

*Primary Examiner*—David C. Payne
*Assistant Examiner*—Leon-Viet Q Nguyen
(74) *Attorney, Agent, or Firm*—Nathan O. Jensen; Kyle Eppele

(57) ABSTRACT

A method of determining transmission parameters for a wireless transceiver is disclosed. According to the method, a state table is loaded into a transceiver. The state table includes a plurality of states, each of which has a set of transmission parameters associated therewith. Based upon characteristics of the signals received from a signal source, the transceiver is assigned a first state. The received signals are received and processed using the set of transmission parameters associated with the first state. It is determined whether an observed behavior of the received signals exceeds a threshold associated with the first one of the plurality of states. The transceiver is assigned a second state when the behavior exceeds the threshold. The received signals are received and processed using the set of transmission parameters associated with the second state.

15 Claims, 9 Drawing Sheets

U.S. PATENT DOCUMENTS

| | | | | |
|---|---|---|---|---|
| 5,742,593 | A | | 4/1998 | Sharony et al. ............. 370/330 |
| 5,748,362 | A | | 5/1998 | Delacourt et al. .......... 359/326 |
| 5,812,938 | A | * | 9/1998 | Gilhousen et al. ............ 455/69 |
| 5,909,469 | A | | 6/1999 | Frodigh et al. ............. 375/302 |
| 5,920,703 | A | | 7/1999 | Campbell et al. ........... 709/236 |
| 5,949,760 | A | | 9/1999 | Stevens et al. ............. 370/280 |
| 5,953,344 | A | | 9/1999 | Dail et al. .................. 370/337 |
| 5,983,259 | A | | 11/1999 | Campbell et al. ........... 709/200 |
| 6,014,089 | A | | 1/2000 | Tracy et al. ........... 340/870.02 |
| 6,018,528 | A | | 1/2000 | Gitlin et al. ................. 370/436 |
| 6,031,827 | A | | 2/2000 | Rikkinen et al. ........... 370/330 |
| 6,075,797 | A | * | 6/2000 | Thomas ...................... 370/468 |
| 6,084,888 | A | | 7/2000 | Watanabe et al. ........... 370/473 |
| 6,084,889 | A | | 7/2000 | Murakami .................. 370/474 |
| 6,088,659 | A | | 7/2000 | Kelley et al. ................. 702/62 |
| 6,094,425 | A | | 7/2000 | Auger et al. ................ 370/330 |
| 6,094,429 | A | | 7/2000 | Blanchette et al. ......... 370/337 |
| 6,122,293 | A | | 9/2000 | Frodigh et al. ............. 370/473 |
| 6,140,184 | A | | 10/2000 | Dupuy et al. ............... 370/337 |
| 6,151,319 | A | | 11/2000 | Dommety et al. ..... 370/395.52 |
| 6,157,656 | A | | 12/2000 | Lindgren et al. ............ 370/458 |
| 6,252,868 | B1 | | 6/2001 | Diachina et al. ............ 370/347 |
| 6,256,304 | B1 | | 7/2001 | Vayrynen .................... 370/350 |
| 6,256,477 | B1 | | 7/2001 | Eidson et al. .............. 455/63.3 |
| 6,275,506 | B1 | | 8/2001 | Fazel et al. ................. 370/459 |
| 6,304,559 | B1 | | 10/2001 | Jacklin et al. .............. 370/310 |
| 6,310,867 | B1 | | 10/2001 | Tat et al. .................... 370/254 |
| 6,314,084 | B1 | | 11/2001 | Kahale et al. .............. 370/230 |
| 6,317,436 | B1 | | 11/2001 | Young et al. ............... 370/443 |
| 6,324,184 | B1 | | 11/2001 | Hou et al. ................. 340/7.43 |
| 6,331,973 | B1 | | 12/2001 | Young et al. ............... 370/337 |
| 6,353,598 | B1 | | 3/2002 | Baden et al. ............... 370/280 |
| 6,353,605 | B1 | | 3/2002 | Rautanen et al. ........... 370/337 |
| 6,369,719 | B1 | | 4/2002 | Tracy et al. ........... 340/870.02 |
| 6,384,739 | B1 | | 5/2002 | Roberts, Jr. et al. ........ 340/905 |
| 6,389,273 | B1 | | 5/2002 | Brandenburg ............... 455/296 |
| 6,414,955 | B1 | | 7/2002 | Clare et al. ................. 370/390 |
| 6,442,157 | B1 | | 8/2002 | Carter et al. ................ 370/347 |
| 6,466,793 | B1 | | 10/2002 | Wallstedt et al. ........... 455/450 |
| 6,487,186 | B1 | | 11/2002 | Young et al. ............... 370/336 |
| 6,498,667 | B1 | | 12/2002 | Masucci et al. .............. 398/98 |
| 6,504,829 | B1 | | 1/2003 | Young et al. ............... 370/337 |
| 6,515,972 | B1 | | 2/2003 | Gage et al. ................. 370/328 |
| 6,529,443 | B2 | | 3/2003 | Downey et al. .............. 367/76 |
| 6,553,424 | B1 | | 4/2003 | Kranz et al. ................ 709/234 |
| 6,556,899 | B1 | | 4/2003 | Harvey et al. ................ 701/29 |
| 6,574,206 | B2 | | 6/2003 | Young ........................ 370/337 |
| 6,600,754 | B1 | | 7/2003 | Young et al. ............... 370/459 |
| 6,628,636 | B1 | | 9/2003 | Young ........................ 370/337 |
| 6,631,124 | B1 | | 10/2003 | Koorapaty et al. .......... 370/337 |
| 6,643,322 | B1 | | 11/2003 | Varma et al. ................ 375/227 |
| 6,711,177 | B1 | | 3/2004 | Young ........................ 370/468 |
| 7,079,604 | B1 | * | 7/2006 | Miller et al. ................. 375/343 |
| 7,139,313 | B2 | * | 11/2006 | Wang .................... 375/240.12 |
| 2002/0001294 | A1 | | 1/2002 | Amouris ..................... 370/337 |
| 2002/0046381 | A1 | | 4/2002 | Morris et al. ............... 714/752 |
| 2002/0142792 | A1 | * | 10/2002 | Martinez .................... 455/550 |
| 2003/0016174 | A1 | * | 1/2003 | Anderson ................... 342/378 |
| 2003/0054825 | A1 | * | 3/2003 | Chen et al. ................. 455/442 |
| 2003/0086366 | A1 | * | 5/2003 | Branlund et al. ........... 370/208 |
| 2003/0202574 | A1 | | 10/2003 | Budka et al. ............... 375/227 |
| 2005/0032542 | A1 | * | 2/2005 | Wilborn et al. ............. 455/525 |
| 2005/0141461 | A1 | * | 6/2005 | Hosein et al. .............. 370/335 |
| 2005/0272458 | A1 | * | 12/2005 | Sakoda ....................... 455/522 |

OTHER PUBLICATIONS

Bittle, Caples, Young, "Soldier Phone: An Innovative Approach to Wireless Multimedia Communications," 1998 IEEE MILCOM, vol. 3.

Sunlin, "A Hybrid Distributed Slot Assignment TDMA Channel Access Protocol," IEEE Military Communications Conference, 1990, vol. 3 of 3.

Young and Stevens, "Clique Activation Multiple Access (CAMA): A Distributed Heuristic for Building Wireless Datagram Networks," IEEE Military Communications Conference 1998, vol. 1.

Ju et al. "An Optimal Topology-Transport Scheduling Method in Multihop Packet Radio Networks." IEEE/ACM Transactions on Networking. Jun. 1998. pp. 298-306.

Chakraborty et al. "Generic Algorithm for Broadcast Scheduling in Packet Radio Networks," Evolutionary Computation Proceedings, 1998. IEEE World Congress on Computational Intelligence. May 4-9, 1998. pp. 183-188.

Pond et al. "Distributed Time-Slot Assignment Protocol for Mobile Multi-Hop Broadcast Packet Radio Networks," IEEE MILCOM, 1989. Oct. 15-18, 1989. pp. 70-74.

Arikan, E. "Some Complexity Results about Packet Radio Networks," IEEE Tranactions on Information Theory, v.IT-30, No. 4, Jul. 1984, pp. 681-685.

Chou et al. "Slot Allocation Strategies for TDMA Protocols in Multihop Packet Radio Network." Eleventh Annual Joint Conference of the IEEE Computer and Communications Societies. May 4-8, 1992. pp. 710-716.

Oono et al. "Dynamic Slot Allocation Technology for Mobile Multi-Media TDMA Systems Using Distributed Control Scheme," IEEE. Oct. 12-16, 1997. pp. 74-78.

U.S. Appl. No. 10/782,716, "Hybrid Open/Closed Loop Filtering For Link Quality Estimation," filed Feb. 19, 2004, Steven VanLaningham et al.

PCT U.S. Appl. No. 10/589,846, "Link Adaption For Mobile Ad Hoc And Mesh Networks," filed Feb. 19, 2004, Steven VanLaningham et al.

Young, "USAP: A Unifying Dynamic Distributed Multichannel TDMA Slot Assignment Protocol," Proc. IEEE MILCOM 1996, vol. 1, Oct. 1996.

I. Chlamtac and A. Farago, "An Optimal Channel Access Protocol with Multiple Reception Capacity," Dept. of Telecommunications & Telematics, Technical University of Budapest, Budapest, Hungary. Publication date unknown; believed to be 1993.

\* cited by examiner

| Received Signal Strength | | | | | |
|---|---|---|---|---|---|
| SNR <Expected Error Rate> | Low | | | High | |
| | Symbol Error Rate | | | Symbol Error Rate | |
| | Low | High | | High | Low |
| Low <High> | Good Link, No Margin | Weak Signal | | Interference | Good Link, minimal margin against interference |
| High <Low> | Good Link, Minimal Margin | Combined Low Signal and Multipath | | Multipath | Good Link, Ample Margin |

*Figure 7*

| Power SiSrateIndex | Highest Power | ... | ... | Lowest Power |
|---|---|---|---|---|
| Most Efficient | 54 | | | 63 |
| ... | 50 | | | 62 |
| ... | 46 | 58 | 61 | 60 |
| ... | 42 | 55 | 59 | 57 |
| ... | 38 | 51 | 56 | 53 |
| ... | 34 | 47 | 52 | 49 |
| ... | 30 | 43 | 48 | 45 |
| ... | 26 | 39 | 44 | 41 |
| ... | 22 | 35 | 40 | 37 |
| ... | 18 | 31 | 36 | 33 |
| ... | 14 | 27 | 32 | 29 |
| ... | 10 | 23 | 28 | 25 |
| ... | 6 | 19 | 24 | 21 |
| ... | 3 | 15 | 20 | 17 |
| ... | 1 | 11 | 16 | 13 |
| | | 7 | 12 | |
| | | 4 | 8 | |
| Most Robust | 0 | 2 | 5 | 9 |

*Figure 9*

GENERIC TRANSMISSION PARAMETER CONFIGURATION

FIELD OF THE INVENTION

The invention relates to communications, and more particularly, to a system and method for communicating over a wireless network.

BACKGROUND OF THE INVENTION

Wireless communications networks have found great utility in many commercial and military applications. Many wireless communications transceivers are designed for use with a single type of signal or protocol such as spread spectrum or orthogonal frequency division multiplexing (OFDM). Even if a transceiver is equipped to receive and understand more than one type of signal or protocol, the transceiver may not be able to adjust its operation or transmission parameters to optimize the performance of the transceiver.

Another factor in transceiver design is the variability of conditions in which a transceiver may be used. The transceiver may optimally respond differently in rough terrain environments than it would respond when moving rapidly. It may be difficult to maximize transmissions from the transceiver in all environments. While known multi-use transceivers provide some degree of optimization in response to differing environments, such transceivers are ill-equipped to respond to changing environments or future network configurations. Jamming and electronic counter-measure protocols are constantly changing and improving, and the complexity and demands of friendly network communications are constantly growing. Constant redesign and testing of transceivers in response to changing requirements is expensive and time-consuming.

It is therefore an object of the invention to provide a transceiver capable of maximizing its performance with a variety of signal types.

It is another object of the invention to provide a transceiver that can have its performance optimized in different operating environments.

A feature of the invention is the use of one or more state tables, loadable into the transceiver at the time of use of the transceiver, where each of the state tables provides optimal transmission parameters for the transceiver in response to observed behaviors of detected signals.

An advantage of the invention is that a transceiver can be quickly reconfigured to respond to changing environments or encountered signal types.

Another advantage of the invention is that the transceiver can be quickly and temporarily reconfigured to be optimized for specific missions or applications.

SUMMARY OF THE INVENTION

The invention provides a method of determining transmission parameters for a wireless communication transceiver. According to the method, a state table is loaded into a transceiver. The state table includes a plurality of states, each of which has a set of transmission parameters associated therewith. Signals are received from a signal source. Based upon characteristics of the received signals, the transceiver is assigned a first state. The received signals are received and processed using the set of transmission parameters associated with the first state. A behavior of the received signals is observed. It is determined whether the behavior exceeds a threshold associated with the first one of the plurality of states. The transceiver is assigned a second state when the behavior exceeds the threshold. The received signals are received and processed using the set of transmission parameters associated with the second state. The assigning of the second state operates to change at least one of signal transmission rate and transmission power used with the received signals.

The invention also provides a wireless transceiver including transceiver circuitry configured to receive and send wireless signals according to a plurality of transmission parameters. A memory is configured to receive a state table. The state table includes a plurality of states. Each state contains values for each of the plurality of transmission parameters. A processor observes at least one behavior of an incoming signal and assigns one of the plurality of states, with the respective values for each of the plurality of transmission parameter, to the transceiver circuitry, wherein the assigned state optimizes performance of the transceiver given the observed behavior.

The invention further provides a wireless transceiver including: means for loading a state table into a transceiver that includes a plurality of states, each of the plurality of states having a set of transmission parameters associated therewith; means for receiving signals from a signal source; based upon characteristics of the received signals, means for assigning to the transceiver a first state; means for receiving and processing the received signals using the set of transmission parameters associated with the first state; means for observing a behavior of the received signals; means for determining whether the behavior exceeds a first threshold associated with the first state; means for assigning to the transceiver a second state when the behavior exceeds the threshold; and means for receiving and processing the received signals using the set of transmission parameters associated with the second state, wherein the assigning of the second state operates to change at least one of signal transmission rate and transmission power used with the received signals.

BRIEF DESCRIPTION OF THE DRAWINGS

FIG. 7 is a decision table used for determining transmission scenarios.

FIG. 9 is a chart showing an ordering of states based upon efficiency and robustness.

DETAILED DESCRIPTION OF THE DRAWINGS

A technique is described here to generalize the configuration of transmission parameters and the algorithm used to adapt them at runtime. The goal is to make the transceiver as unaware as possible of the specific properties of each received signal. This will minimize the changes required as development proceeds and the radios are tested in the field. When it is desirable to change the way the transceiver behaves in response to specific channel conditions, it will just be a matter of generating a new configuration and reloading the transceivers(s). To accomplish this the software will avoid hard coded parameters and instead rely on configuration data to provide it with the database needed to control the received signal.

Figure 1:
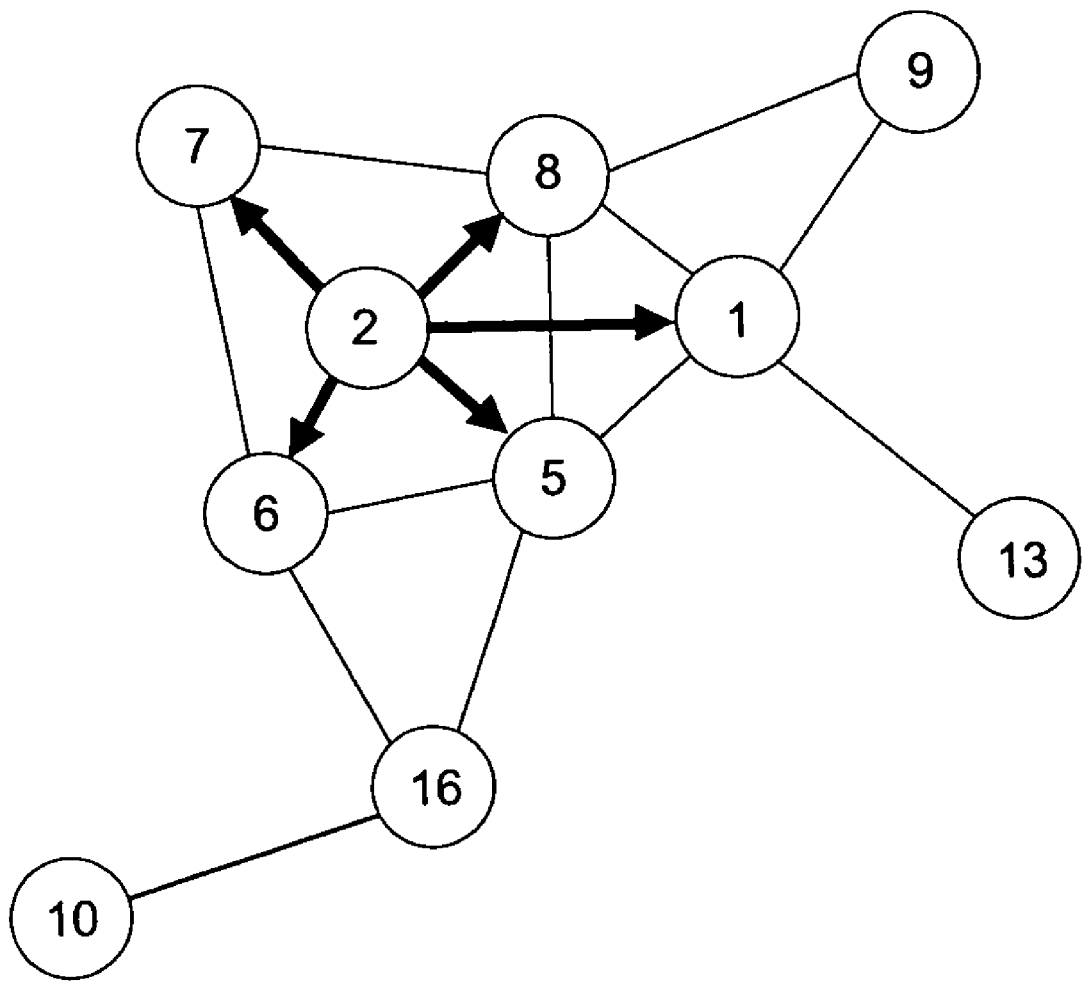
FIG. 1 is a schematic diagram of a network of wireless communication transceivers.

FIG. 1 is a depiction of a wireless communications network N. Network N includes a plurality of transceivers, which are shown as nodes 1, 2, 3, etc. As the types of signals transmitted by the transceivers may vary, a method of configuring the transceivers for different types of signals has been invented.

Figure 2:
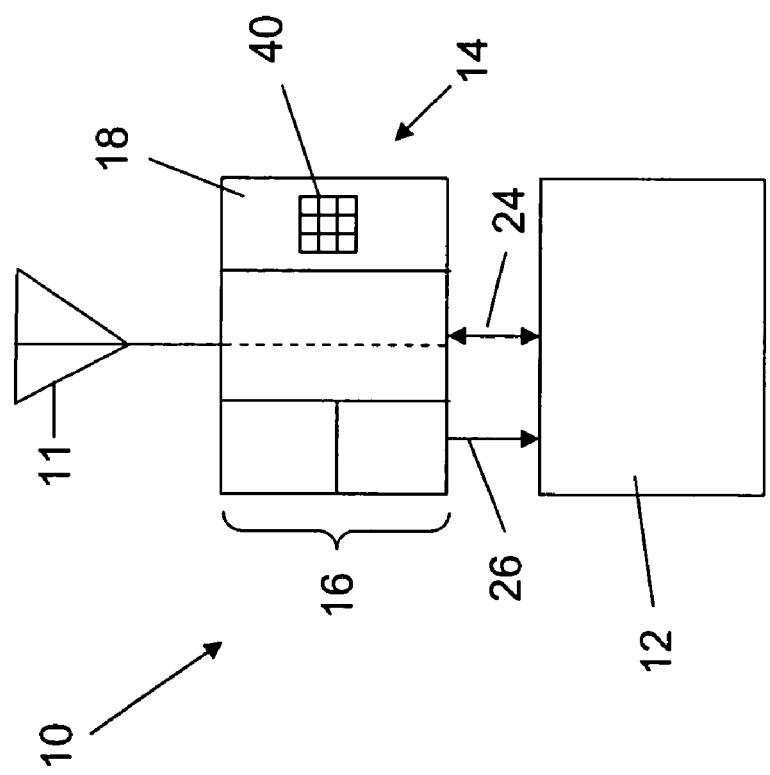
FIG. 2 is a schematic diagram of one of the transceivers of FIG. 1.

FIG. 2 shows a single transceiver 10 that may form part of communication network N. Transceiver 10 includes one or more antennas 11 to transmit to and detect messages from other transceivers. Transceiver 10 also includes transceiver circuitry 12, operationally connected to the antenna, to process the detected messages from other transceivers. The transceiver circuitry may include modulators, demodulators, signal sources, amplifiers, and the like. Transceiver 10 further includes a state machine 14, shown here as interposed between the antenna and the transceiver circuitry. State machine 14 includes a hardware portion 16 and a software portion 18. Hardware portion 16 includes processor functionality 20, a memory functionality 22, a communications interface 24 that relays signals between the transceiver circuitry and the antenna, and an instruction interface 26 that instructs the transceiver circuitry how to process, receive, and transmit signals. Processor functionality 20 and memory functionality 22 may be realized by using processor time and memory space of components forming part of the transceiver circuitry. Alternatively a dedicated state machine processor and a dedicated state machine memory may also be used.

Software portion 18 of the state machine includes discrete sets of operating parameters for the transceiver. Each discrete set can be considered a state, which as shown at reference number 6 in FIG. 3 contains a plurality of parameters 32 that are used by the transceiver circuitry to process incoming signals from another transceiver and transmit signals thereto. The parameters include a state identification number, a transmission power level, and the level and type of diversity used in the transmission. Diversity as stated herein refers to the relative number of transceivers in a network that are transmitting the same message through the network. Other parameters include a forward error correction (FEC) rate, a modulation type which may be a type of differential phase-shift keying, and a frequency spreading rate (which refers to a factor of spreading frequencies in an orthogonal frequency division multiplexing (OFDM) transmission protocol). Except for the state identification number, the parameters affect either the power level at which a message may be sent/received, or the rate at which the message may be sent/received. State 6 is part of a state table, such as the table 42 depicted in FIG. 4, which includes a plurality of states (states 1-16). The values for the operating parameters 32 for each state are uniquely different from the parameters of other states in the state table, and serve to increase or decrease the rate and/or the power of the transmission signals associated with the transceiver. In the two-dimensional table 42, states 1-16 are arranged so that a horizontal movement between states represents a change in transmitting power, and a vertical movement between states represents a change in transmission rate.

To move from one state to another, it must be determined whether the parameters associated with a state are appropriate for the signal given the behavior of the signal. To make this determination, state machine 14 observes signal behavior using at least two measurements: the signal-to-noise ratio (SNR) of the observed incoming signal, and the symbol error rate (SER) of the observed incoming signal. An unacceptably high SNR indicates that the transceiver should use a state with higher transmit power level than the currently used state. A very high SNR indicates that the transceiver may move to a state with a lower transmit power level than the currently used state, without unduly affecting transmission quality. An unacceptably high SER indicates that the transceiver should use a state with a lower data transmission rate than what is provided by the currently used state. A very low SER indicates that the transceiver may use a state with a higher data transmission rate than what is provided by the currently used state.

Figure 3:
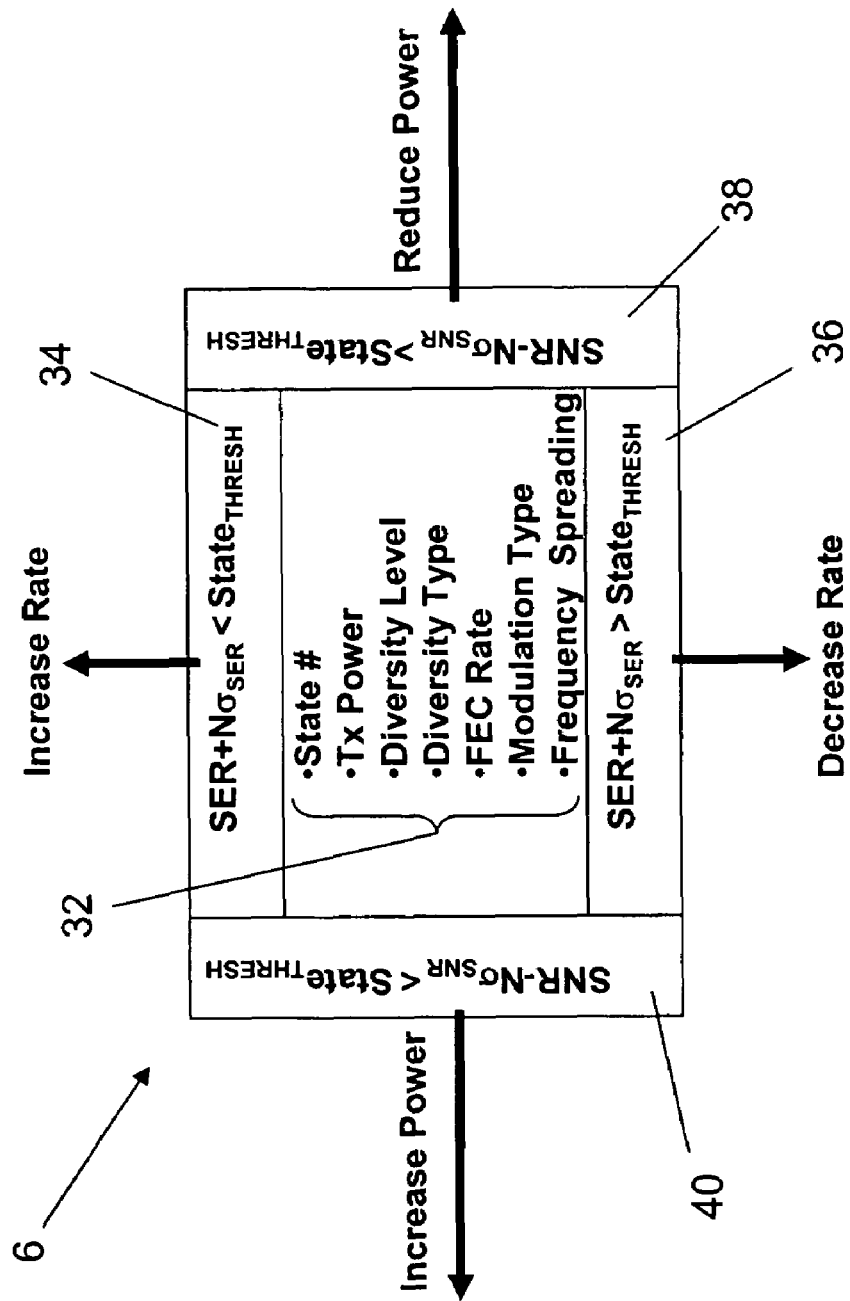
FIG. 3 is a schematic diagram of a transmission state.
Figure 4:
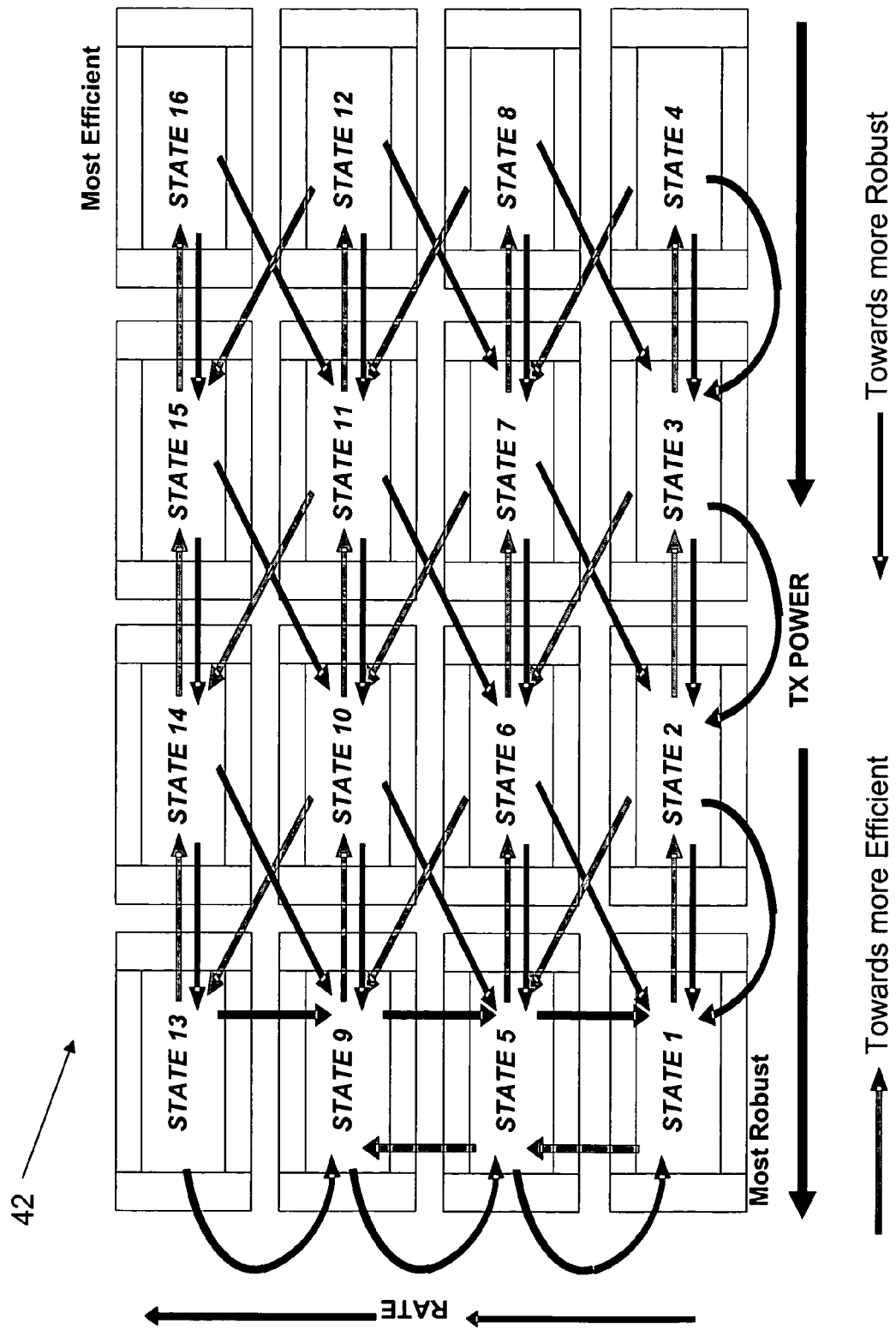
FIG. 4 is a schematic diagram of a state table.

Determining whether the SER and the SNR of a given signal are unacceptable at a current state is preferably accomplished using a combination of thresholds 34, 36, 38 and 40. Exceeding any one of these threshold levels will cause the state machine to instruct the transceiver circuitry to use parameters associated with a different state. As depicted in FIGS. 3 and 4, each state has four thresholds which determine whether the transceiver should move to a different state. Changes to a different state may move in a vertical, horizontal, or diagonal direction. If, for example, the SNR at state 6 is less than threshold 34, then the transceiver changes to a state in the state table that decreases the transmit power level. In FIG. 4 this generally equates to a horizontal movement to the right, for example from state 6 to state 7. If the SNR at state 6 is less than threshold 36, then the transceiver changes to a state in the state table that increases the transmit power level. In FIG. 4 this generally equates to a horizontal movement to the left, for example from state 6 to state 5. If the SER at state 6 is less than threshold 40, then the transceiver changes to a state in the state table that increases the data transmission rate. In FIG. 4 this generally equates to an upward diagonal movement, for example from state 6 to state 9. If the SER at state 6 is greater than a second threshold, then the nodes change to a state in the state table that decreases the data transmission rate. In FIG. 4 this generally equates to a downward diagonal movement, for example from state 6 to state 3. The decision of whether to move in a straight line or diagonally from one state to another in a state table is predetermined within the state table. Of course, if the values for SNR and SER at state 6 are within ranges that are not affected by thresholds 34, 36, 38 or 40, then the state used by the transceiver is not changed.

The threshold values used to determine whether to move to a different state may be standard throughout the state table (10e-5 for SER, for example), or each state may have unique threshold values.

If the transceiver is operating in a state on an edge of the state table, for example state 9, it may not be possible to move to another state that further reduces power. In such an instance it may be preferable to increase the rate instead, for example moving to state 13. Likewise, in the case of state 3, it may not be possible to move to another state that further reduces the data transmission rate. In such an instance it may be preferable to increase the power level instead, for example moving from state 3 to state 2.

The states in FIG. 4 are depicted in a way that suggests a linear, stepped increase in rate and power as states move from down to up and from right to left, respectively. While this may be the case in some instances, the arrangement of the states in the state table is intended primarily to express relative increases in rate and power. Indeed, the change in transmission rate between states 5 and 9 may be less than the change in transmission rate between states 9 and 13, but the transmission rate increases as the transceiver moves from state 5 to state 9 and then to state 13.

Figure 5:
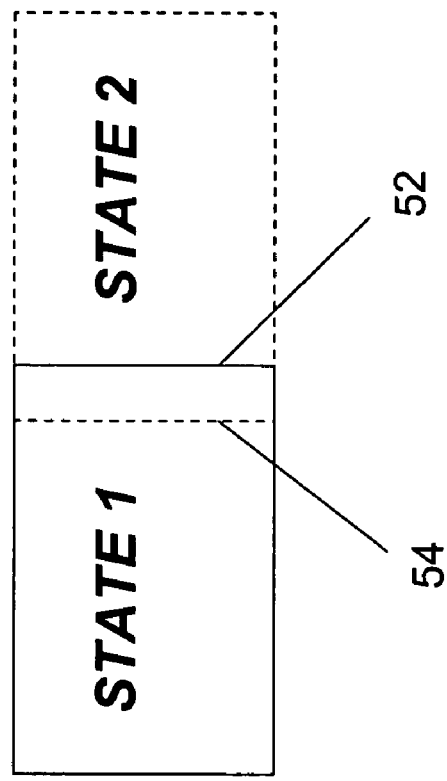
FIG. 5 is a schematic diagram of a portion of the state table of FIG. 4.

The thresholds of adjacent states are selected so that slight changes in the observed behaviors (e.g., SER and SNR) immediately after a state change do not result in an immediate return, or toggle, to a previous state. FIG. 5 graphically depicts states 1 and 2 of FIG. 4, and a threshold 52 of state 1 corresponding to a decrease in transmit power level is depicted as a line within state 2. A threshold 54 of state 2 corresponding to an increase in transmit power level is depicted as a line within state 1. Once a transceiver passes threshold 52 and changes from state 1 to state 2, the transceiver must pass threshold 54 to re-enter state 1. Therefore, slight changes in the SNR after switching to state 2 would not immediately result in a rapid return to state 1.

The decision of whether to change from one state to another may take into account the relative stability of the observed behaviors. For example, a relatively constant value for the SNR or SER may suggest future stability of those values, and it would be considered proper to change states based upon a comparison of the observed behaviors to the corresponding thresholds. On the other hand, a wildly oscillating SER value may suggest uncertainty as to future stability of that measurement, and such uncertainty should be taken into account when deciding whether to change states. According to the invention, a time sample is taken of the observed behaviors, and a mean deviation of the sample is calculated. The mean deviation is multiplied by a weighting factor, which may be different for each threshold and each state, and the combined value is used when comparing the observed behaviors with the respective thresholds. For example, as shown in FIG. 3, the transceiver will change to a state having an increased transmission rate when the following expression is true:

$$SER + N\sigma_{SER} < State_{THRESH-34}$$

where

SER is the observed symbol error rate,

N is the weighting factor, $\sigma_{SER}$ is the mean deviation of the SER, and $State_{THRESH-34}$ is a value associated with threshold 34.

The transceiver will change to a state having a decreased transmission rate when the following expression is true:

$$SER + N\sigma_{SER} > State_{THRESH-36}$$

where $State_{THRESH-36}$ is a value associated with threshold 36.

The transceiver will change to a state having a reduced power level when the following expression is true:

$$SNR - N\sigma_{SNR} > State_{THRESH-38}$$

where

SNR is the observed signal-to-noise ratio,

N is the weighting factor, $\sigma_{SNR}$ is the mean deviation of the SNR, and $State_{THRESH-38}$ is a value associated with threshold 38.

The transceiver will change to a state having an increased power level when the following expression is true:

$$SNR - N\sigma_{SNR} < State_{THRESH-40}$$

where $State_{THRESH-40}$ is a value associated with threshold 40.

The effect of considering a weighted mean deviation of the observed behavior is to not change to a different state if there is sufficient instability in the observed behavior. This prevents premature or unnecessary state changes.

Figure 6:
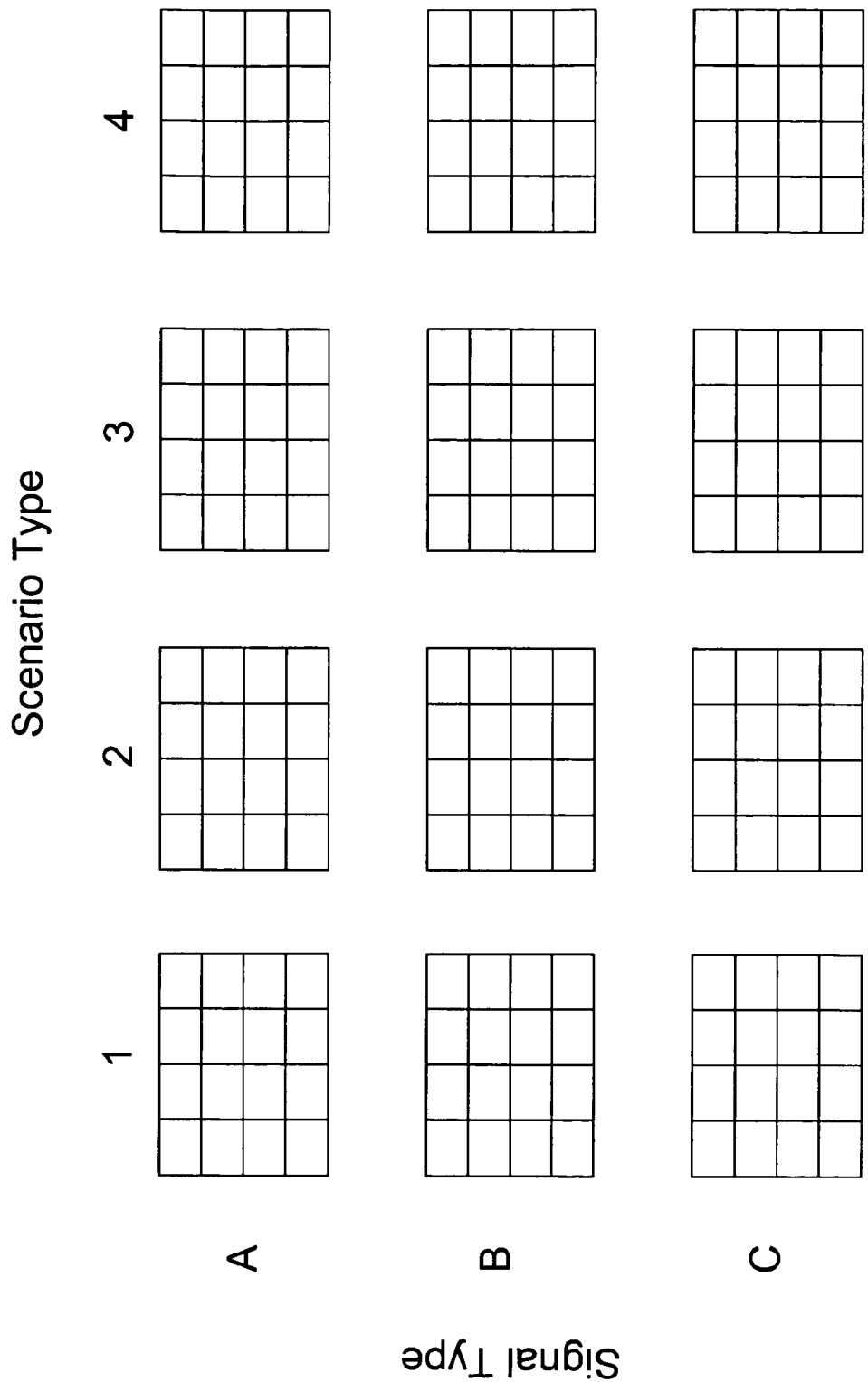
FIG. 6 is a schematic diagram of a plurality of state tables.

For effective network communications, each transceiver in a network may have loaded therein a state table for each type of signal it is anticipated to encounter, such as OFDM, spread spectrum protocols, or the like. Unknown or unanticipated signal types may be assigned a default state table. Furthermore, each node may also have a state table for multiple scenarios in which each type of signal may be encountered. Scenarios may include rough terrain, non-moving or slow-moving nodes, high movement nodes (such as fixed-wing aircraft), hostile signal environment (i.e., jamming & surveillance). FIG. 6 is a schematic depiction showing multiple state tables that may be used by a transceiver depending on the signal type encountered (A, B, C) and scenario type (1, 2, 3, 4).

The transceiver may access state tables having different strategies used in transmitting and receiving signals. For instance, if it is desirable for the transceiver to maximize its data transmitting rate, the transceiver is loaded with a 'maximize rate' state table reflecting that strategy. The transceiver moves through states in the 'maximize rate' state table such that transmit power is increased until a maximum data transmitting rate is achieved. On the other hand, it may be desirable to maximize the reuse, or simultaneous use, of communication resources, and the transceiver would then be loaded with a 'maximize reuse' state table reflecting that strategy. The transceiver maintains a list of neighboring transceivers with which it desires to communicate. The transceiver moves through entries in the state table such that transmit power is increased until the transceiver is communicating with the desired neighboring transceivers. At that point the transceiver moves through states in the state table that maintain the level of transmit power but optimize other transmission parameters as shown in FIG. 3. Using the 'maximize reuse' state table, the transceiver uses only the transmit power sufficient for its transmit needs, and other transceivers may therefore reuse, or simultaneously use, transmit power that would otherwise unnecessarily be expended by the first transceiver. The 'maximize rate' and 'maximize reuse' state tables may be considered scenarios as shown in FIG. 6.

Figure 8:
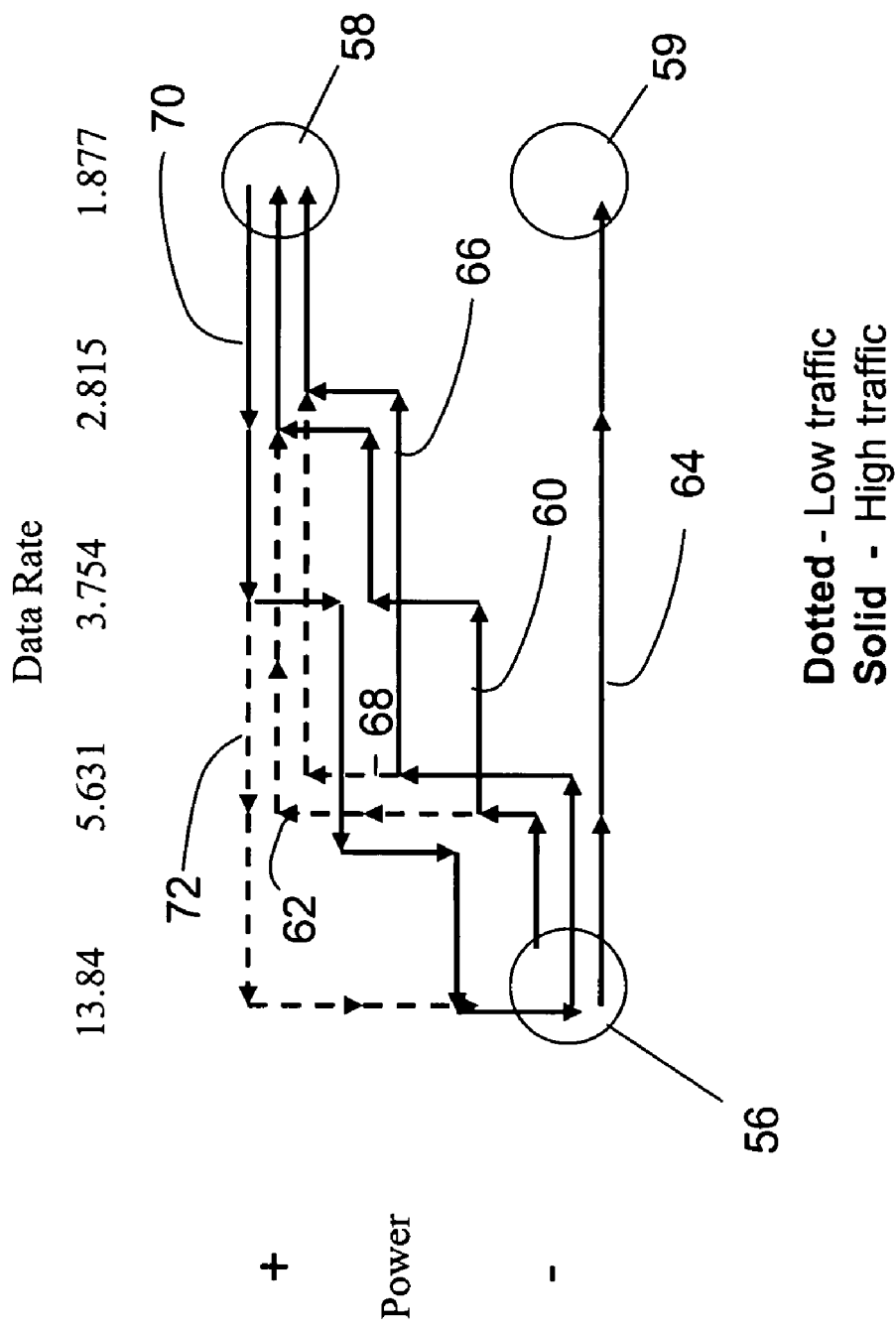
FIG. 8 is a schematic diagram showing movement of signals, in different transmission scenarios, through a state table.

Alternatively, it may be preferable to use a single state table that may be used regardless of the type of transmission scenario encountered. FIGS. 7 and 8 depict a method for, using four observed behaviors, predicting the type of transmission scenario encountered and providing a strategy for moving through a state table. The four observed behaviors are SNR, SER, received signal strength, and the amount of traffic a transceiver is required to transmit. Four basic scenarios can be derived from the chart of FIG. 7:

1. A weak signal, evidenced by low signal strength, low SNR, and high SER. A weak signal may be advantageously benefited by increasing power at the expense of the data rate, and a transceiver operating in high traffic in such a scenario would therefore follow line 60 from a low-power, high-rate state 56 to a high-power, low-rate state 58, provided the thresholds for each intermediate state are met (FIG. 8). A transceiver operating in low traffic with a weak signal would likely follow line 62 from state 56 to state 58. Line 62 follows a path that boosts power more quickly than line 60, and in low traffic situations a transceiver is more able to do so.

2. A multipath scenario, evidenced by high SNR, high signal strength, and high SER. A transceiver operating in high or low traffic in such a scenario would likely follow line 64 from low-power, high data-rate state 56 to a low-power, low-data rate state 59, provided the appropriate thresholds for each intermediate state are met.

3. A high-interference scenario, evidenced by low SNR, high SER, and high received signal strength. A transceiver encountering interference would likely be benefited by increasing power at the expense of the data rate to provide a more robust transmission, and the transceiver when operating in high traffic in such a scenario would likely follow line 66 from low-power, high data-rate state 56 to high-power, low data-rate state 58, provided the appropriate thresholds for each intermediate state are met. A transceiver operating in low traffic in a high-interference scenario would likely follow line 68 between states 56 and 58. Line 68 follows a path that boosts power more quickly than the path followed by line 66, and in low traffic situations a transceiver is more able to do so.

4. A scenario in which it is determined that a good link has been established, as evidenced by a low SER. A transceiver having a good link could increase data rate at the expense of power to provide the most efficient transmission, and the transceiver when operating in high traffic in this scenario would likely follow line 70 between high-power, low data-rate state 58 to low-power, high data-rate state 56, provided the appropriate thresholds for each intermediate state are met. A transceiver operating in low traffic in a good-link scenario would likely follow line 72 between states 58 and 56. Line 72 follows a path that increases the data rate more quickly than the path followed by line 70, and in low traffic situations a transceiver is more able to do so.

The transmission parameters of a state table can be used to produce a preference index that assists a transceiver in determining which of several communication links to use when sending a transmission. In FIG. 4 the sixteen states are ordered by state number, in which an increase in state number roughly corresponds to an increase in efficiency and a decrease in state number roughly corresponds to an increase in robustness. FIG. 9 is a chart showing an ordering of 64 states, in which there are 16 unique data transmission rates and four unique transmit power level. The 64 states are ordered or ranked from 0, representing the most robust state, to 63, representing the most efficient state. There may be some arbitrariness in the ranking process, as the $23^{rd}$ ranked state may not be substantially more efficient than the $22^{nd}$ ranked state, but a difference of 10 to 20 in rankings indicates a substantial difference in efficiency or robustness. The rankings or priority numbers preferably are normalized so that the normalized rankings are expressed as a number, between 0 and 99, for example, that a transceiver may consult when determining which communication link available to the transceiver provides the most efficient or most robust link. For example, in FIG. 1 node 2 has communication links with neighboring nodes 1, 5, 6, 7 and 8. Signals passing along each communication link are evaluated according as previously described herein and are assigned a state number. Node 2 may be transmitting to node 1 using the transmission parameters associated with robust state 5 (FIG. 4), but node 2 may also be transmitting to node 7 using the transmission parameters associated with efficient state 15. If node 2 desires or is required to send a message in an environment requiring a robust transmission node 2 will send the message through node 1 because the priority or ranking of the link between nodes 2 and 1 is less than the priority or ranking of the link between nodes 2 and 7. On the other hand, if node 2 desires or is required to send a message in an environment where the most efficient transmission is optimal, node 2 will send the message through node 7 because the priority or ranking of the link between nodes 2 and 7 is greater than the priority or ranking of the link between nodes 2 and 1. While FIG. 9 demonstrates an ordering of states based upon efficiency and robustness, the states in a state table may be ordered or prioritized according to any desired parameter or objective.

Figure 10:
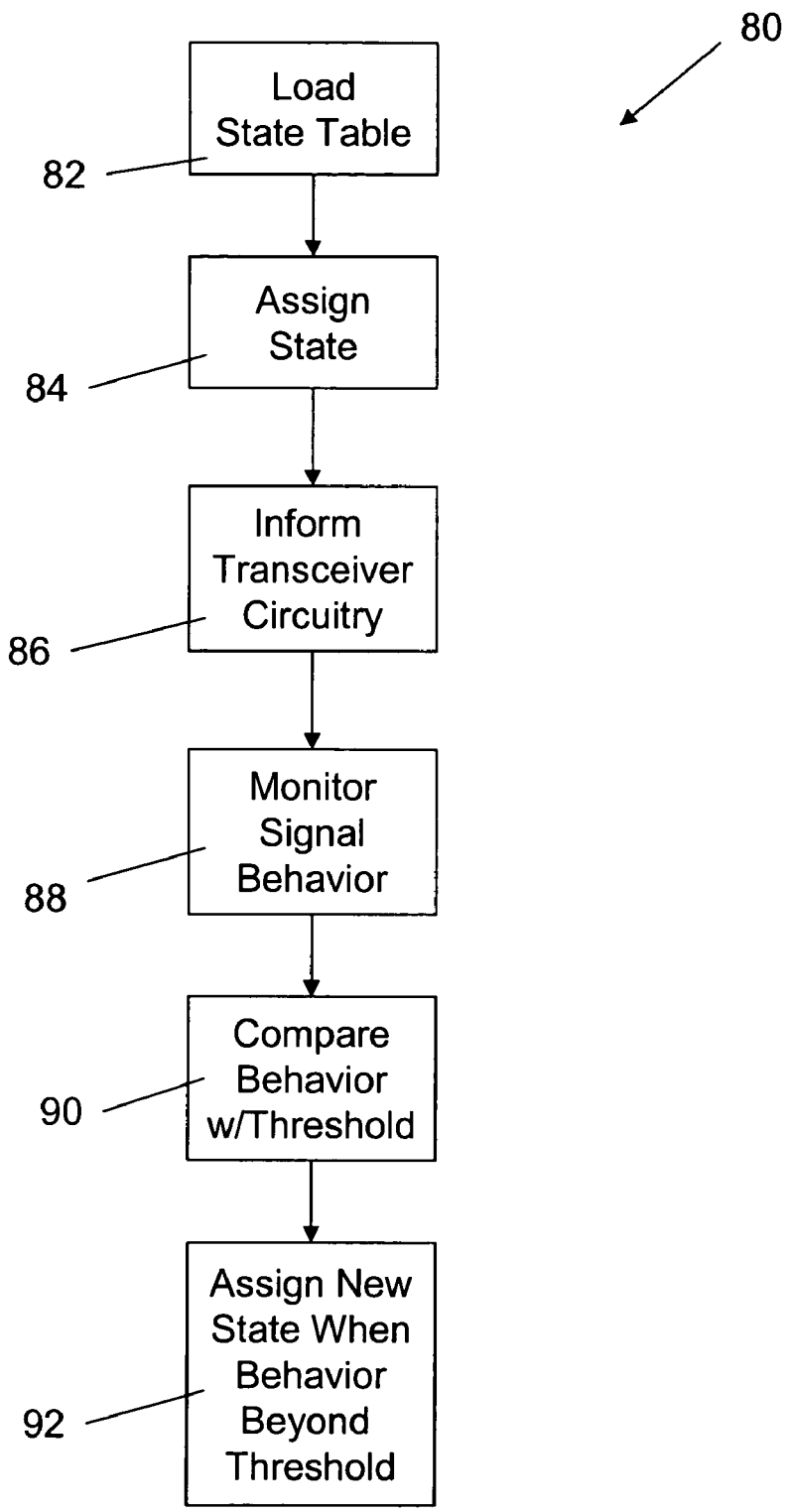
FIG. 10 is a block diagram depicting a method according to the invention.

The disclosure has described the nature of the state table and the contents of its component states. A method of using the state table, according to the invention, and as shown at reference number 80 in FIG. 10, will now be described. In step 82 a state table, such as state table 40, is incorporated into software portion 18 of state machine 14 (FIG. 1). A received signal from another transceiver preferably includes a header having transmission parameters relevant to the signal. In step 84 state machine 14 uses the parameters from the header to determine which state in state table 40 should be used to process the received signal. The selected state includes transmission parameters such as power level, diversity level and type, FEC rate, modulation type, and frequency spreading rate, all of which are relayed to transceiver circuitry 12 through instruction interface 26 in step 86. Transceiver circuitry 12 uses the transmission parameters to optimally process the received signal. Transceiver 10 transmits to neighboring transceivers, in a message header, the transmission parameters it is using for the received signal. Alternatively, if other transceivers are loaded with state table 40, the message header may simply reference which state from state table 40 is being used.

In step 88 state machine 14 monitors or observes the received signal, and derives values representative of behaviors of the signal. As previously explained, such behaviors may include the SNR and the SER of the received signal. State machine also determines the mean deviation, over time, of the SNR and SER. In step 90 it is determined whether either the observed values of the SNR or the SER are beyond thresholds associated with the assigned state. If so, in step 92 transceiver 10 is directed to use a different state as previously described, and neighboring transceivers are notified of the change in state.

This document has presented a technique for making a very complex transmission parameter algorithm table driven so that it can be configured offline. The loading of a desired state table is performed after the transceiver circuitry has been finalized, and such loading may be performed even in real time during a specific mission in response to changes in environment, signal type, or signal strategy as described herein. An advantage of the invention is that the behavior of the transceiver and all of the characteristics of the received signal can be specified at run time, thereby giving the maximum flexibility during the development and fielding of a radio type. Without modifying the software or the transceiver circuitry it will be possible to change the way the radio responds to various channel conditions and adapts to the different types of signals it must support.

Another advantage of the invention is that because the state table is loaded into the transceiver rather than hard-wired, portions of the transceiver may be designated as unclassified because classified algorithm and performance details will be loaded rather than hard-coded.

Still another advantage of the invention is that the multiple transmission scenarios can be accommodated in either a single state table or in multiple state tables.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of determining transmission parameters for a wireless communication transceiver, comprising:
   loading a state table into a transceiver that includes a plurality of states, each of the plurality of states having a set of transmission parameters associated therewith;
   receiving signals from a signal source;
   based upon characteristics of the received signals, assigning to the transceiver a first one of the plurality of states;
   receiving and processing the received signals using the set of transmission parameters associated with the first one of the plurality of states;
   observing a behavior of the received signals;
   determining whether the behavior exceeds a threshold associated with the first one of the plurality of states;
   assigning to the transceiver a second one of the plurality of states when the behavior exceeds the threshold; and
   receiving and processing the received signals using the set of transmission parameters associated with the second one of the plurality of states;
   wherein the assigning the second one of the plurality of states operates to change at least one of signal transmission rate and transmission power used with the received signals;
   wherein the state table is a first state table configured for use with a first type of signal, and further including a second loadable state table configured for use with a second type of signal, the method further including:
   assigning to the transceiver one of the plurality of states from the first state table when the received signals are the first type of signal; and
   assigning to the transceiver one of a plurality of states from the second state table when the received signals are the second type of signal.

2. The method of claim 1, wherein the behavior is a signal-to-noise ratio of the received signals.

3. The method of claim 2, wherein the determining step factors in an amount of variance, over time, of the signal-to-noise ratio when determining whether the signal-to-noise ratio exceeds the threshold.

4. The method of claim 1, wherein the behavior is a symbol error rate of the received signals.

5. The method of claim 4, wherein the determining step factors in an amount of variance, over time, of the symbol error rate when determining whether the symbol error rate exceeds the threshold.

6. The method of claim 1, wherein the determining step further includes determining whether the behavior, modified by a behavior stability factor, exceeds the threshold associated with the first one of the plurality of states.

7. The method of claim 6, wherein the behavior stability factor is a time-based, weighted mean deviation of the observed behavior.

8. The method of claim 1, wherein the first set of transmission parameters includes a factor expressing how many times a transceiver in a network repeats a transmission of a signal, wherein the transmission is transmitted on at least one frequency.

9. The method of claim 1, wherein the first set of transmission parameters includes a factor expressing a forward error correction rate.

10. The method of claim 1, wherein the first set of transmission parameters includes a type of modulation to be used with the received signals.

11. The method of claim 1, wherein the transceiver is a node in a network of a plurality of nodes, and further wherein the determining step includes factoring in how many transmissions the transceiver is required to transmit.

12. The method of claim 11, wherein the determining step further includes factoring in a received signal strength.

13. A method of determining transmission parameters for a wireless communication transceiver, comprising:
   loading a state table into a transceiver that includes a plurality of states, each of the plurality of states having a set of transmission parameters associated therewith;
   receiving signals from a signal source;
   based upon characteristics of the received signals, assigning to the transceiver a first one of the plurality of states;
   receiving and processing the received signals using the set of transmission parameters associated with the first one of the plurality of states;
   observing a behavior of the received signals;
   determining whether the behavior exceeds a threshold associated with the first one of the plurality of states;
   assigning to the transceiver a second one of the plurality of states when the behavior exceeds the threshold;
   receiving and processing the received signals using the set of transmission parameters associated with the second one of the plurality of states;
   wherein the assigning the second one of the plurality of states operates to change at least one of signal transmission rate and transmission power used with the received signals; and
   wherein the state table is a first state table configured for use with a first transmission scenario, and further including a second loadable state table configured for use with a second transmission scenario, the method further including assigning to the transceiver one of the plurality of states from the first state table when the transceiver determines the presence of the first transmission scenario, and assigning to the transceiver one of a plurality of states from the second state table when the transceiver determines the presence of the second transmission scenario.

14. The method of claim 1, wherein the states in the state table are defined such that a threshold from one of the states overlaps a threshold from another of the states.

15. A method of determining transmission parameters for a wireless communication transceiver, comprising:

loading a state table into a transceiver that includes a plurality of states, each of the plurality of states having a set of transmission parameters associated therewith;

receiving signals from a signal source;

based upon characteristics of the received signals, assigning to the transceiver a first one of the plurality of states;

receiving and processing the received signals using the set of transmission parameters associated with the first one of the plurality of states;

observing a behavior of the received signals;

determining whether the behavior exceeds a threshold associated with the first one of the plurality of states;

assigning to the transceiver a second one of the plurality of states when the behavior exceeds the threshold;

receiving and processing the received signals using the set of transmission parameters associated with the second one of the plurality of states;

wherein the assigning the second one of the plurality of states operates to change at least one of signal transmission rate and transmission power used with the received signals; and wherein the state table is a first state table configured to maximize signal transmission rate of the transceiver, and further including a second loadable state table configured to maximize efficient transmit power use of the transceiver, the method further including assigning to the transceiver one of the plurality of states from the first state table when it is desired to maximize the signal transmission rate of the transceiver, wherein the transceiver is directed to use successive others of the plurality of states to increase transmit power until a maximum transmit rate is achieved; and assigning to the transceiver one of a plurality of states from the second state table when it is desired to maximize efficient transmit power use of the transceiver, wherein the transceiver is directed to use successive others of the plurality of states to maintain a transmit power level when said transceiver has communicated with all neighboring transceivers with which said transceiver is required to communicate.

\* \* \* \* \*